United States Patent Office 3,326,674
Patented June 20, 1967

3,326,674
CONICAL LEACHING APPARATUS
Marshall P. Neipert and Charles K. Bon, Midland, Mich., assignors to The Dow Chemical Company, Midland, Mich., a corporation of Delaware
Filed Nov. 30, 1964, Ser. No. 414,523
9 Claims. (Cl. 75—97)

This invention relates to extraction and in particular concerns a new and novel conical, high speed, and efficient leaching apparatus. This apparatus is particularly suitable for recovering peroxides from oxidized alkali metal amalgams.

In general, alkali metal peroxides may be recovered from their corresponding amalgams (alloys of mercury with an alkali metal) by first oxidizing the amalgam, with, for example, oxygen, then contacting the amalgam so-oxidized with a leaching solution, such as water to convert the oxidized alkali metal to the corresponding alkali metal peroxide. The peroxide dissolves in the leaching solution leaving elemental mercury, which may be recovered, combined with more alkali metal, and recycled back to the oxidizer and leacher as amalgam for additional production of alkali metal peroxide.

Various difficulties are encountered, however, in leaching oxidized amalgam in this manner, particularly in the leaching of oxidized sodium amalgam. For example, mercury oxides which form during oxidation of the amalgam tend to have a catalytic effect in the decomposition of the alkali metal peroxide values if said mercury oxides are allowed to remain in contact with the peroxide for any length of time. Accordingly, leaching must be as rapid as possible while still providing the maximum conversion to the desired peroxide and recovery of this product. Also, the heat of solution of the alkali metal peroxide as it dissolves in the leaching solution causes the temperature of the reaction mass in the leaching apparatus to rise, thus further promoting the aforesaid decomposition. The time and temperature parameters, therefore, are very important as to the prevention and minimizing the decomposition of peroxide solutons.

One type of conventional leaching apparatus which is commonly known and used for the above purposes is a vertically disposed column or tower adapted with a cooling means and packed with a number of rings, baffles, or the like, designed to agitate the contents of the column. In operating such a tower, oxidized amalgam is introduced at the top while the leachant, such as, for example, an alkaline aqueous medium, is introduced at the bottom to produce an agitated countercurrent flow of materials. In so doing, the aqueous sodium contacts the amalgam as it 'descends the column in an impeded manner due to said baffles or rings, thus promoting agitation, and converts the oxidized alkali metal amalgam, such as sodium amalgam, to peroxide solution and elemental mercury. The mercury is drawn off at the bottom while the solution is collected by overflow from the top of the tower. If desired, the pH of the leaching solution may be adjusted to either convert the oxidized amalgam to hydrogen peroxide or alkali metal peroxide.

Though such an apparatus permits an acceptable leaching operation, it is undesirable in that it requires a relatively long inventory time, thus promoting the catalytic decomposition of the peroxide as described hereinbefore. A normal minimum inventory time, for example, of materials in such a leacher having dimensions of 4 inches in diameter by 6 inches in length, is about 2 minutes. That such an inventory time is excessive is evidenced by the fact that a 13 to 16 percent loss in peroxygen value may be lost during the tower leaching operation. In addition, the tower leacher has a limited capacity. For example, the leacher having the above dimensions has the capacity of accepting up to about 100 percent of the oxidized amalgam produced from only a 4000 ampere mercury-chlorine cell. Accordingly, a high speed and efficient leaching apparatus is needed in the art which provides a low inventory time and high capacity leaching operation.

The principal object of the present invention is to provide a novel high capacity apparatus for rapidly leaching one material with another, wherein a minimum inventory time is provided.

A further object is to provide such an apparatus particularly adapted to high speed leaching of oxidized alkali metal amalgams for the production of alkali metal peroxides therefrom.

The invention will be fully understood from the following detailed description when read in conjunction with the appended drawings wherein.

In accordance with the present invention, the above objects and advantages are obtained in an apparatus which comprises in combination a vessel or reactor with a removable top closure having disposed therein a hollow inverted frustrated cone element having a cone angle within a particular range, and friction or turbulance producing means, such as, for example, vertical fin-like projections along the inside wall thereof. The cone element is attached by support members to one end of a drive shaft, which shaft extends through said top closure, the end external to the reactor being attached to a driving means. Between the cone element and top closure of the reactor is interposed a slinger ring or disc attached to the drive shaft, having a diameter at least equal to that of the top of the cone element, and preferably greater, but spaced from the walls of the reactor. Inlet and outlet means are provided for the reactor, said outlet and inlet means being preferably located to provide, among other things, maximum circulation in the reactor. The removable top of the reactor is adapted with an inlet port for introducing the material to be treated. The port is so-positioned that said material is received in the reactor by the slinger ring. For temperature control of the reaction mass, means are provided, such as, for example, a jacket around the external wall of the reactor to provide a closed annulus between the exterior of the reactor vessel and the interior of said jacket wall, said jacket being fitted with an inlet and outlet, through which a fluid heat exchanging media may be circulated.

The various inlet and outlet means or ports as used and described herein are meant to include both transport conduit and any gates, valves, pumps, and the like in combination therewith as are needed to effect, promote, aid or cause the introduction into or discharge of materials out of the reactor.

The term "inverted frustrated cone" as used herein refers to an element or member in the apparatus of the present invention having a geometric shape in the nature of a frustrum of a cone inverted in that the smaller diameter end of the frustrum when positioned in said apparatus is lower than the larger diameter end.

Figure 1:
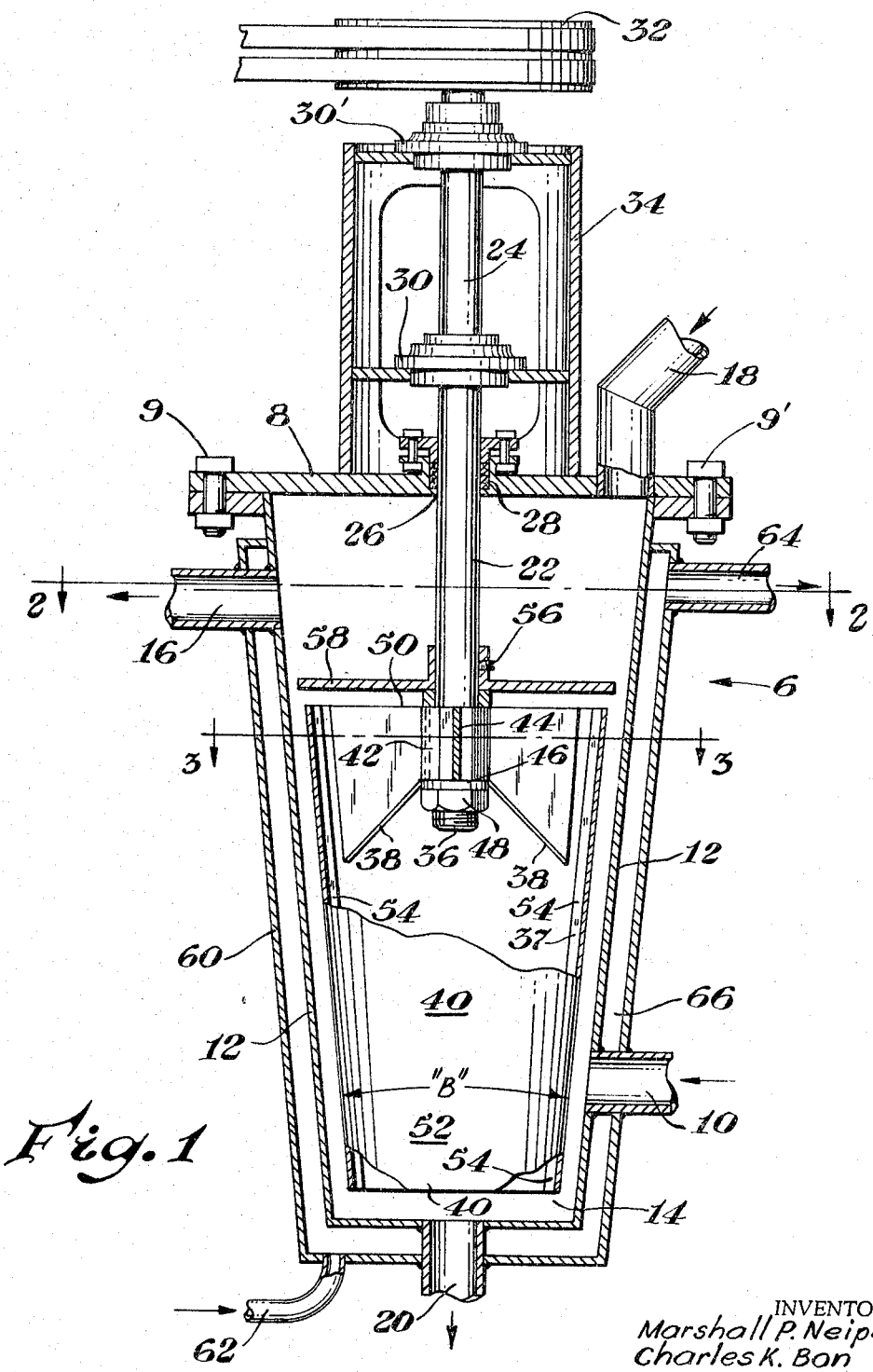
FIG. 1 is a side elevational view, partly in section, of one embodiment of the apparatus of the present invention.
Figure 2:
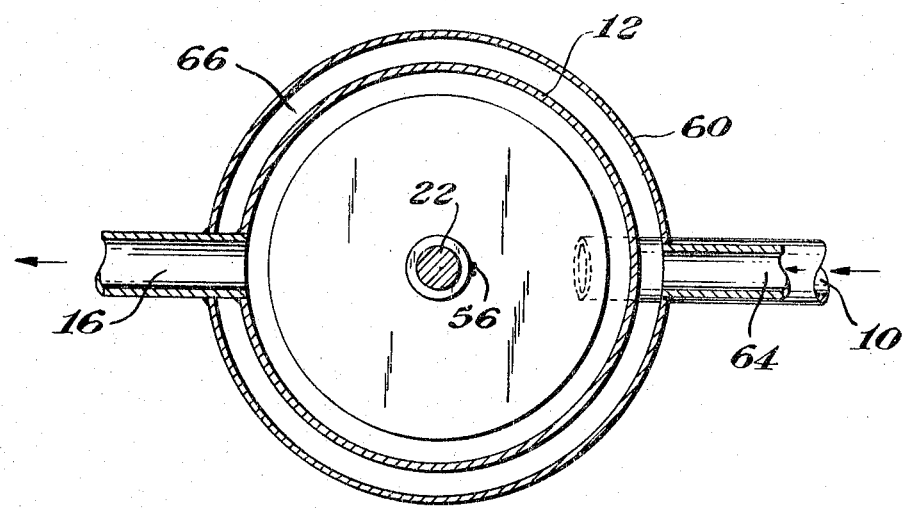
FIG. 2 is a plan view of FIG. 1 taken along line 2—2 thereof.
Figure 3:
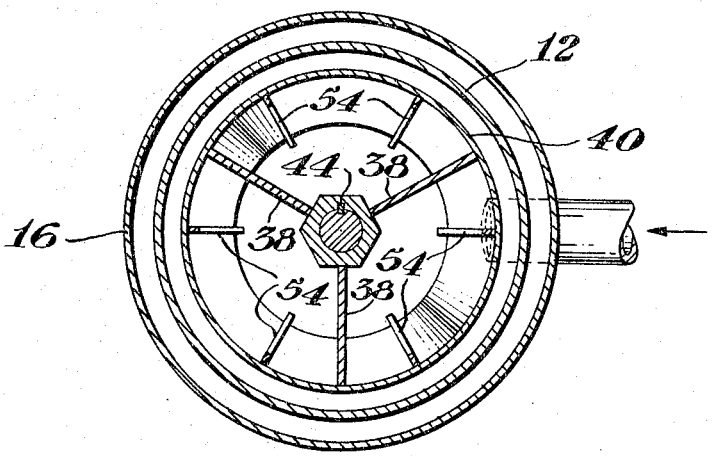
FIG. 3 is a plan view of FIG. 1 taken along line 3—3 thereof.

With reference now to the drawing, FIG. 1 shows one specific embodiment of the novel apparatus of the present invention comprising in combination: a reactor vessel 6, preferably having a removable top closure 8 held by nut and bolt assemblies 9 and 9', said vessel 6 having an inlet 10 located in the vessel wall 12 at or near the bottom 14 thereof. Also located in the vessel wall 12 but at or near the top thereof preferably opposite inlet 10 is an outlet 16. The top 8 is adapted with an inlet port 18. In addition, there is provided in, at, or near the bottom of the reactor outlet means 20. Centrally disposed within the apparatus as shown in FIG. 1 is a vertically disposed drive shaft 22, one end 24 of which extends upwardly through an opening 26 in the top 8 and out of the reactor vessel, said opening 26 through which the drive shaft 22 passes being adapted with, for example, a conventional packing gland assembly 28. The end 24 external to the reactor is connected through a bearing and support assembly 30 and 30′ to drive means, such as, for example, a pulley 32 supported above the top 8 of the reactor by a vertical support member 34, and a motor (not shown). Connected at or near the other threaded end (lower end) 36 of the drive shaft 22 by a plurality of radial supports 38 is a hollow, rotatable, inverted, frustrated cone element or conic section 40, having a cone angle "B" within the range of from about 3 to about 30 degrees and preferably from about 8 to 10 degrees. The radial supports 38 are affixed to the wall of the cone and are placed at substantial equal angles between each support 38. The center junction of the members 38 is a tubular joint 42 which slidably engages the end 24 of the drive shaft 22 and is held in a given position secured on the shaft 22 by a key-slot assembly 44, washer 46, and nut 48. The cone element 40 is positioned vertically within the reactor, has a larger diameter (upper) end 50, a smaller diameter end 52, is spaced from the reactor wall 12, top 8, and bottom 14, sufficient to allow a flow of materials therethrough, and is equipped with a plurality of inwardly projecting fin members 54 rigidly attached, vertically disposed, and equally spaced around the inside of the cone 40. Interposed between said cone 40 and top 8, but below outlet 16, and attached to the drive shaft 22 by a set screw 56 is a slinger ring 58 positioned on said shaft close to but spaced from the upper end 50 of the cone 40. The diameter of the slinger ring 58 is at least as great as that of the top 50 of the cone 40 and preferably a little larger. For temperature control a coolant jacket wall 60 with a coolant inlet 62 and a coolant outlet 64 is provided and disposed around the exterior of the reactor vessel 6 providing an annulus 66 or, in effect, providing a double walled vessel. Said coolant inlet 62 and outlet 64 are preferably located in the jacket wall 60 to promote maximum circulation of coolant around the reactor.

The angle "B" of the cone 40 (see FIG. 1) is essential in the present novel apparatus for satisfactory performance. An essentially vertically walled cylinder does not produce the necessary pumping action needed to circulate the reaction materials in the reactor during operation. Too great a cone angle on the other hand results in various mechanical difficulties. Accordingly, as aforesaid, an operable range of cone angle "B" to obtain satisfactory results is within the range of from about 3 to about 30 degrees, while optimum results may be obtained with a cone angle of from about 8 to 10 degrees.

The diameter of the slinger ring is equally essential in that it must at last be equal to and preferably greater than the diameter of the top of the cone element so that the material to be treated will be caused to flow in the proper manner as will be discussed hereinafter.

In practicing the present invention employing an embodiment of the leaching apparatus similarly as shown in the drawings, oxidized sodium amalgam, for example, is leached either with water or an aqueous neutral, basic, or alkaline leaching solution having a maximum normality, for example, of about 4. The apparatus is first put into motion by rapidly rotating the cone 40 and slinger ring 58, for example, from about 200 to about 600 r.p.m. by a driving means. A continuous flow of leaching solution is then introduced into the reactor through inlet 10 while oxidized amalgam is introduced through the inlet 18 in top 8 of the apparatus. The oxidized amalgam falls on the slinger ring 58 and is slung or thrown off against the reactor wall 12, whereupon it slides down said walls, in contact with the leaching agent, to the bottom 14 of the reactor where it is picked up by the rotating cone 40 aided by fins 54 therein and lifted to the point where it contacts the underside of the slinger ring and is deflected again to cause a downward flow between the reactor wall and cone. The fin members produce a needed friction between the rotating cone and material in the bottom of the reactor necessary to lift said material by means of the cone. Friction or turbulence producing means other than fins may, of course, also be employed. The amalgam is thereby placed in further contact with said solution due to the centrifugal force generated. The flow of the leaching solution through the apparatus is adjusted so as to provide a suitable effluent rate and a temperature sufficient to permit conversion of essentially all the oxidized alkali metal to peroxide while providing an extremely low inventory time of the reactants in the reactor. So-converted, the peroxide solution is continuously drawn off through the outlet 16. Mercury is drawn or drained off by means of the outlet 20 provided at the bottom 14 of the reactor. In addition, coolant such as water is also circulated through the cooling jacket 60 during the operation at a rate to provide the proper degree of cooling as normally measured by the effluent temperature of the discharging peroxide solution.

During operation, in the conversion and recovery of peroxides from alkali metal amalgams as aforesaid, impure elemental mercury metal forms at the bottom of the reactor together with oxidized and partially spent amalgam to be leached. It is essential, therefore, in order to continuously circulate the amalgam in contact with the leaching solution that there be a friction producing means about the inside thereof and that the bottom 52 of the hereinbefore described cone element 40 be in sufficient contact with said mercury and amalgam formed at the bottom 14 of the reactor to provide the requisite centrifugal lifting of the material as the cone rotates. A sufficient contact of the cone 40 with said material may be provided, for example, either by positioning the cone, or by regulating the level of said material, so that in any event the cone dips into the mercury-amalgam to a depth, for example, of from about ¼ to about ½ inch. Ordinarily, however, the depth of contact is controlled by regulating the level of the liquid material in the bottom of the reactor. This is readily accomplished by controlled removal of elemental by-product mercury and the like through the outlet 20 provided.

A suitable operable temperature for leaching in this apparatus is one at which the formation of detrimental mercury oxides is minimized, this is normally within the range of from about 0° to about 20° C. and preferably from about 0° C. to about 5° C. In any event, the specific temperature of operation may readily be determined by one skilled in the art, depending on the material to be treated.

During the leaching operation, the oxidized alkali metal in the amalgam is converted upon contact with the leachant to the corresponding peroxide in solution, or, possibly to hydrogen peroxide, depending on whether the leaching solution is neutral or alkaline, or acidic, respectively. Conversion to the alkali metal peroxide is preferred, however, since the acid conversion tends to promote decomposition to a larger extent.

By means of the present novel apparatus, the amalgam is kept in constant agitated contact with the leaching solution but at a proper minimum inventory, temperature, and contact time to avoid detrimental catalytic decomposition of the peroxide by the mercury oxides.

The following examples more fully illustrate the present novel apparatus and its use but are not to be construed as limiting the invention thereto.

EXAMPLE I 0.0061 mol percent sodium amalgam was stoichiometrically oxidized to sodium peroxide in an oxidizer with oxygen. The amalgam so-oxidized was then fed into a leaching apparatus similar to this shown in the figures, the cone of which as 2½ inches in diameter at the top, 1½ inches in diameter at the bottom by 3 inches high, constructed in accordance with the present invention, and operated at about 200 r.p.m. cone speed, at an input rate of amalgam equivalent to about 4.3 pounds of sodium per hour. About 177 pounds per hour of water as a leaching agent at about 12° C. was fed to the apparatus.

The leaching apparatus was refrigerated by means of circulating 3° C. water in the cooling jacket to maintain the sodium peroxide effluent at a temperature of about 17° C. The overall heat coefficient obtained was 485 (B.t.u./hr./ft.$^2$/° F.). The yield of sodium peroxide (3 percent $Na_2O_2$ solution) coming out of the leacher was about 96.6 percent, representing only a 3.4 percent loss (due to incomplete conversion of the oxidized alkali metal plus catalytic decomposition). Resulting elemental mercury was drawn off at the bottom of the reactor as required. After scrubbing this was reused to prepare more oxidized amalgam.

The loss of 3.4 percent in Example I, therefore, is dramatically less than 13–16 percent loss suffered by means of the column leacher of equivalent size as hereinbefore discussed, thus illustrating the superior performance of the present novel leacher over that of the conventional columns heretofore used.

EXAMPLE II 0.103 mol percent sodium amalgam was stoichiometrically oxidized to the peroxide in an oxidizer with oxygen. The amalgam so-oxidized was then fed into a leaching apparatus in accordance with the present invention constructed of nickel and operated at about 200 r.p.m. cone speed, at an input rate of amalgam of about 45,000 pounds per hour (144 pounds $Na_2O_2$). The cone had a top diameter of about 15½ inches and a length of about 23 inches. Clearance between the cone and reactor wall was about ½-inch. The slinger ring had a diameter of 15¾ with a clearance of 9 inches between it and the cone and a clearance of ¼-inch with the side wall of the reactor.

The leaching apparatus was refrigerated by means of the circulating 4° C. water in the cooling jacket to maintain the sodium peroxide effluent at a temperature of about 6.5° C. The overall heat coefficient obtained was 219 B.t.u./hr./ft.$^2$/° F. The yield of sodium peroxide (3 percent $Na_2O_2$ solution) coming out of the leacher was about 100 percent, which included a leaching loss too small to be readily measured. Resulting elemental mercury was drawn off at the bottom of the reactor as required, for reuse, after scrubbing, to prepare more oxidized amalgam.

This leaching apparatus and operation was of sufficient capacity to remove about 99 percent of the oxidized sodium amalgam from a 60,000 ampere mercury-chlorine cell. In addition, it provided a minimum inventory time or contact time of peroxide solution with amalgam of under about 45 seconds.

Clearly, then, it can be seen that the present novel leaching apparatus is far superior in performance to conventional type leachers, as described hereinbefore, in that a greatly reduced inventory time of reactants is provided, thus markedly increasing throughput, together with a greatly increased efficiency and speed in the recovery of oxidized alkali metal as peroxide in solution.

Though the present apparatus has been described primarily with respect to leaching and to leaching sodium values, it may also be used in other applications of separation or leaching peculiarly applicable to the present apparatus and principle thereof. In addition, it may be employed in leaching oxidized amalgams other than sodium such as, for example, oxidized potassium-, lithium-, and cesium amalgams.

The present invention may be modified and changed without departing from the spirit or scope thereof and it is understood that we limit ourselves only as defined in the appended claims.

We claim:
1. A leaching apparatus comprising in combination a walled reactor vessel adapted with a removable top, inlet and outlet means in the side walls of said reactor, a second inlet means located in said removable top and a second outlet means located in the bottom of said reactor vessel, a hollow inverted frusto-conical element positioned within the said vessel and spaced from the vessel walls, said cone element having a cone angle within the range of from about 3 to about 30° and a friction producing fin means supported on the internal wall thereof, said cone element attached by support members to one end of centrally and vertically disposed drive shaft extending into the reactor vessel through said top, the other end of said shaft extending up through said top and out of said vessel, a slinger ring connected to said drive shaft extending horizontally therefrom and being positioned between the top of said cone element and the top of said reactor vessel and disposed to receive feed material from said second inlet, said ring being of a diameter at least equal that of the cone element at its greatest diameter point; powering means connected to the external end of the drive shaft to provide rotation to the cone and slinger ring; and a cooling means for said reactor vessel.

2. The apparatus of claim 1 wherein the cone element has a cone angle of from about 8 to about 10°.

3. The apparatus of claim 1 wherein the temperature control means comprises a coolant retaining jacket disposed externally around the vessel to provide an annulus space adapted with a coolant inlet means and coolant outlet means.

4. The apparatus of claim 1 wherein the cone element is equipped with a plurality of fin members as the friction producing means spaced along and attached to the internal wall of said cone.

5. A leaching apparatus comprising in combination:
(a) a continuous wall reactor vessel having an inlet port located in the reactor wall near the bottom thereof, an outlet port in said wall remotely located from said inlet port and near the top of said vessel and discharge means located in the bottom of said reactor vessel;
(b) a removable top for said reactor vessel, said top having an inlet port located therein;
(c) a hollow inverted frusto-conical element positioned within said vessel but spaced from the vessel wall, said cone element having a cone angle within the range of from about 3 to about 30°, vertically disposed fin-like projection spaced around the inside of the cone, and radial support members affixed to the internal wall of the cone element near the top thereof;
(d) a centrally and vertically disposed drive shaft, one end of said drive shaft extending into said reactor vessel through said removable top and connected to said radial support members of said cone element;
(e) a horizontally disposed slinger ring rigidly connected to said drive shaft betwen said cone top and the top of said vessel but being positioned below said outlet port in the wall of said vessel near the top of said vessel, said ring being of a diameter at least equal to the greatest diameter of said cone element but spaced from said vessel wall;
(f) drive means connected to the other end of said drive shaft external to the top of said reactor vessel, said drive means providing rotational power to said cone element and said slinger ring; and
(g) a temperature control means comprising a jacket disposed externally around the wall of the reactor, said jacket providing a closed annular space between the outer wall of said reactor vessel and the inner wall of said jacket, said jacket being adapted with an inlet and outlet means.

6. The leaching apparatus of claim 5 wherein the cone element has a cone angle of from about 8 to about 10°.

7. A method of leaching oxidized metal amalgam in a continuous manner with an aqueous leaching agent which comprises:
(a) introducing an oxidized amalgam onto a rapidly rotating disc supported and powered by a drive shaft, said disc being surrounded by but spaced from a continuous side wall of a reactor vessel within which the disc is disposed, said vessel having a removable top and a bottom, thereby allowing said amalgam material to be flung off the disc onto and down the reactor walls to momentarily settle at the bottom thereof;
(b) continuously circulating an aqueous leaching agent into and through the reactor in contact with the amalgam, thereby to convert oxidized metal in the amalgam to peroxide values in solution;
(c) centrifugally lifting the amalgam at the bottom of the reactor into further contact with the leaching agent by means of a rotating inverted frustrated cone element in contact with the amalgam material at the bottom of the reactor, said cone being attached in a vertical position to said drive shaft below the disc but spaced both from the reactor walls and said disc, said cone having a cone angle of from about 3 to about 30°, a diameter less than that of the disc, and a friction producing means carried by the internal wall of said cone; and
(d) discharging (1) aqueous peroxide values through an outlet located above the disc in the reactor wall, and (2) elementary mercury from an outlet means in the bottom of the reactor in a continuous manner at an effluent temperature of the peroxide of from about 0° to about 20° C.

8. The process of claim 7 wherein the cone in step (c) thereof has a plurality of vertically disposed fins spaced around the inside wall of the cone comprising the friction producing means.

9. A method of leaching oxidized metal amalgam with a leaching agent which comprises:
(a) providing a leaching apparatus comprising a reactor vessel having a removable top, bottom and side wall, a hollow rotatable frustrated cone element vertically disposed within but spaced from the vessel connected to a drive shaft having a cone angle of from about 3 to about 30° and a friction producing means carried by the internal wall thereof, a slinger ring attached to said drive shaft and positioned between said cone and said top, having a diameter at least that of the cone at its greatest cross section, a first and second inlet and a first and second outlet means, the first outlet being located in the reactor wall above the slinger ring, the second outlet being located in the bottom of the reactor, and a temperature control means;
(b) introducing an oxidized metal amalgam through the first inlet onto the slinger ring while rotating said ring and simultaneously introducing a leaching agent through the second inlet means in contact with the amalgam as it is flung off the ring and flows down the side wall of the reactor to the bottom thereof, at least some of the oxidized metal in the amalgam being thereby at least partially converted to peroxide values;
(c) centrifugally lifting the amalgam at the bottom of the reactor by means of the rotating cone element, thereby to further place the amalgam in contact with the leaching agent and convert said oxidized metal in the amalgam to peroxide values; and
(d) discharging the peroxide values from the reactor through said first outlet means at an effluent temperature within the range of from about 0° to about 20° C. and elemental mercury by-product material from the bottom of the reactor through said second outlet means.

References Cited

UNITED STATES PATENTS

| 1,146,783 | 7/1915 | Carman | 23—267 |
| 1,284,488 | 11/1918 | Steinard | 23—269 |
| 2,801,163 | 7/1957 | Conforto | 23—312 |
| 2,833,630 | 5/1958 | Loevenstein | 23—267 |

FOREIGN PATENTS

| 418,189 | 7/1910 | France. |
| 67,142 | 3/1893 | Germany. |

NORMAN YUDKOFF, *Primary Examiner.*

G. HINES, *Assistant Examiner.*